A. D. KENNEDY.
MACHINE FOR SEPARATING MEATS OF COTTON SEED FROM THE HULLS.
APPLICATION FILED AUG. 8, 1916.

1,246,108.

Patented Nov. 13, 1917.

Witness
Daniel Webster Jr.

Inventor
Alfred D. Kennedy
By
Attorney

UNITED STATES PATENT OFFICE.

ALFRED D. KENNEDY, OF GREENVILLE, SOUTH CAROLINA, ASSIGNOR OF ONE-HALF TO AMERICAN MACHINE & MANUFACTURING COMPANY, A CORPORATION OF NORTH CAROLINA.

MACHINE FOR SEPARATING MEATS OF COTTON-SEED FROM THE HULLS.

1,246,108.     Specification of Letters Patent.     Patented Nov. 13, 1917.

Application filed August 8, 1916. Serial No. 113,685.

*To all whom it may concern:*

Be it known that I, ALFRED D. KENNEDY, a citizen of the United States, and resident of Greenville, county of Greenville, and State of South Carolina, have invented an Improvement in Machines for Separating Meats of Cotton-Seed from the Hulls, of which the following is a specification.

The object of my invention is to provide an efficient machine for separating the meats of crushed cotton seeds from the hulls and chaff thereof, whereby said meats are in a suitably cleaned condition for subsequent treatment in the presses. Machines of this class are sometimes termed ammonia and protein regulators or separating machines, by reason of the fact that the "meats" to be separated from the hulls contain these constituents.

My object is further to provide, in a machine of this class, means for agitating the crushed seeds to primarily, by sieving action, separate the main portions of the meats from the hulls or lighter portions, then by a second agitation sieving and draft in a mouth-piece, separate the remaining portions of the hulls from the meats and by a general suction removing substantially all of the hulls and chaff from association with the meats, and finally delivering the meats to one conveyer and the hulls and chaff to another, whereby they may be separately removed from the machine.

My object is also to provide, in a machine of the foregoing character, means to control the extent of draft put upon the agitated material to adjust said draft so as to cause the hulls and chaff to be sucked away without loss of the heavier meats.

With these and other objects in view, my invention consists in certain constructions and combinations of devices which coöperate in producing said results, the same being described hereinafter and more specifically pointed out in the claims.

Figure 1:
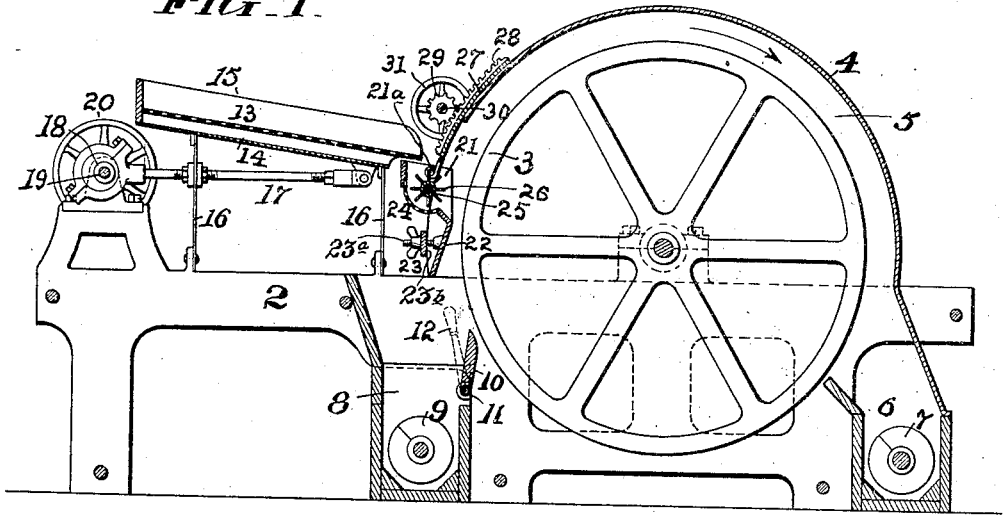
Figure 2:
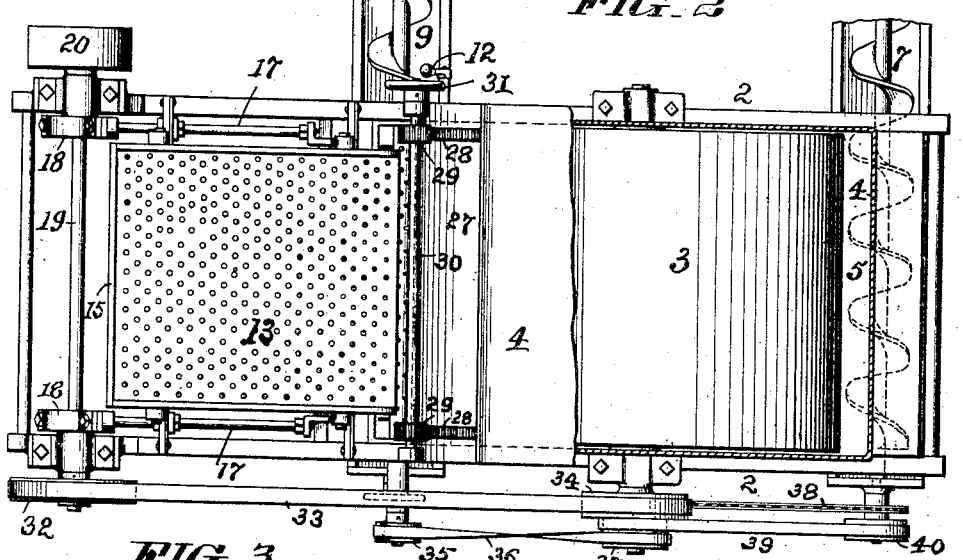
Figure 3:
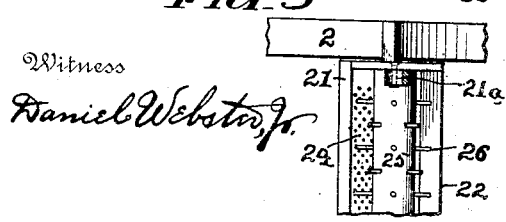

My invention will be better understood by reference to the drawings, in which:—Figure 1 is a sectional side view of a separating machine embodying my invention; Fig. 2 is a plan view of the same, with a portion of the casing broken away; and Fig. 3 is a plan view of a detail showing how the adjustable mouth-piece is suspended.

2 is the main frame, and has suitably journaled therein a large drum 3 inclosed within a casing 4 which extends over it in such manner as to provide a curved passage 5 in which a suction is maintained by the rapid rotation of the drum in the direction of the arrow, Fig. 1.

At the rear of the drum 3 is arranged a hull and chaff box 6 in which is a rotating conveyer screw 7 to receive and convey away the hulls and chaff delivered thereto. At the front or opposite side of the drum 3 is arranged a meat box 8 having a rotating conveyer screw 9 for receiving and conveying the meats from the machine. These conveyers are shown as screws which are rotated in any suitable manner.

19 is a driven shaft which may be rotated by a band pulley 20. This shaft may be fitted with a pulley 32 which drives a belt 33, said belt driving a pulley 34 on the shaft of the drum 3 and by which it is rotated. The drum shaft may have a second pulley 37, which is belted to the rear conveyer 7 by a belt 39 and pulley 40 on the conveyer shaft. The forward conveyer 9 may be driven from the rear conveyer by sprocket and chain transmitting connections 38. Any other suitable means for operating the parts may be employed, if so desired.

The location of the meat box 8 provides a passage or space between it and the drum, and this is bridged by a hinged baffle plate 10, hinged at its bottom to the rear of the meat box by a transverse rod 11 having a handle 12. By this means the baffle plate 10 may be adjusted to vary the open space between the upper or free edge of the plate and the drum, the result of which is to regulate the freedom for passage of air with the drum and in that way adjust the upward draft required to meet the falling meats and hulls.

15 is a sieve box having the inclined perforated bottom 13 upon which the crushed meats are placed and separated from the hulls and chaff, the meats so separated falling upon a solid floor 14 below the perforated bottom 13 and inclined downward to a position over the meat box 8, whereby the said separated meats are directly discharged from the floor into the meat box. The sieve box 15 is suspended upon spring supports 16 of any suitable construction and is vibrated rapidly by pitmen 17 and eccentrics 18 on the shaft 19.

The mixed meats and hulls which do not pass through the perforated floor 13 are fed down its inclined surface and gradually discharged into the adjustable mouth-piece or feeding spout 21, in which they are agitated to permit separation and the hulls to be sucked away by the draft produced by the rotating drum 3. The mouth-piece is provided with a curved perforated bottom 24 through which the agitated meats may pass to the box 8 below, and said mouth-piece is open on top and on the side next to the drum 3. In the mouth-piece is journaled a drum 25 having teeth or short projections 26 which act as agitators or beaters for agitating the contents and projecting it upward in such manner that the hulls and chaff may be caught by the air draft and sucked away from the meats, the latter being of greater weight and falling down into the meat box 8 below. Arranged downward from the open side of the adjustable mouth-piece is the baffle board 22, which preferably forms a double incline with respect to the surface of the drum 3, a short incline downward toward the drum and a long incline away from the drum at the bottom. In this manner, the air draft by the upwardly rising surface of the drum is concentrated at the opening of the mouth-piece facing the drum so that the air currents act upon the agitated material to lift and carry away the hulls and chaff.

To make the mouth-piece adjustable, the following instrumentalities are employed: The casing 4 of the drum chamber terminates above the mouth-piece 21, and fitting over the opening in the casing is a curved plate 27 having racks 28 which mesh with pinions 29 on a transverse shaft 30 to raise and lower the plate 27. The shaft 30 is provided with a suitable hand wheel 31 by which to rotate it. The racks 28 are extended downward, and to their lower ends the mouth-piece 21 is hinged as indicated at 21$^a$ (Figs. 1 and 3). By this construction, the mouth-piece 21 and baffle board 22 are hung from the racks and are bodily moved up or down for adjustment; and as the plate 27 also moves with them, the suction opening under the edge of said plate and over the mouth-piece 21 remains the same but is more or less effective according to the position assumed. Furthermore, the lowering or raising of the baffle board 22 also adjusts the draft by permitting a more or less freedom of air from below. Aside from the vertical adjustment of the mouth-piece and baffle board, the latter is adjustable to and from the surface of the drum 3 to vary the width of draft opening; a smaller opening increasing the force of the draft and vice versa. The means for effecting this adjustment of the baffle board comprises screws 23$^a$ secured to the baffle board and extending through a transverse supporting bar 23$^b$ and adjustable by a hand nut 23. The tendency of the mouth-piece and baffle board is to swing by gravity toward the drum surface and the screws and cross supporting bar acting to restrict such movement to the extent desired. The bar moves over the curved edges of the side frame of the casing 4 so as to permit vertical adjustment of the racks and pinions without displacement of the adjustment of the baffle board with respect to the surface of the drum. Any other suitable means for adjusting the baffle board may be employed, as the particular means for making such adjustment is not material. From the foregoing description, it will be seen that the mouth-piece has capacity for vertical adjustment and also for swinging for special adjustment of the baffle board 22.

The drum 25 of the mouth-piece is rapidly rotated and this may be accomplished in any suitable manner, that shown being by a pulley 35 on the end of the drum shaft and a belt 36 extending about the pulley 37 before referred to on the drum shaft. While the suspending points 21$^a$ of the mouth-piece on the racks are not concentric with the drum axis, this is not essential, because these parts are close together and the extent of swinging adjustment of the drum about the hinge points 21$^a$ is very small. Any other convenient manner of suspending the mouth-piece may be employed for that shown, if so desired.

In operation, the cleaned meats which are separated by the screen or perforated bottom 13 need practically no draft cleansing, but any fine light particles of the hulls or chaff which might pass through the perforated bottom 13 will be carried away by the suction and the clean meats alone pass to the box 8. The rest of the mixture of meats, hulls, etc., passing over the bottom 13, are all delivered gradually into the mouth-piece 21 and receive a dual treatment, namely, a sieving action by the perforated bottom 24 and a violent agitation by the drum 25 which projects the particles in the air draft formed by the rapidly rotating drum 3, said draft carrying away the hulls and chaff to deposit it in the box 6. As it is desirable that none of the meats be sucked off, it is necessary, by means of the baffle board 22 and baffle plate 10, to so adjust the extent of the drafts that this result will be accomplished. As it is not ordinarily possible in crushing the seed to separate all of the meats from the hulls, it is preferable in the present machine to provide capacity for saving such meats which may adhere to the hulls and thereby give them weight; and this is accomplished by the adjustment of the baffle board and plate to reduce the draft just sufficiently to permit the falling of such meat carrying hulls into the meat box. The particular adjustment employed to accomplish this result is the positioning of the baffles farther away from the drum surface to reduce the draft.

I have described and illustrated my invention in the form which I have found to be practical and effective in commercial use, and while I prefer the details set out, I do not restrict myself in this respect, as said details may be varied and modified without departing from the spirit and effectiveness of the invention.

Having now described my invention, what I claim as new and desire to secure by Letters Patent, is:—

1. In a machine of the character stated, the combination of a main frame, a revolving drum, a casing over the drum to form a draft passage, a receiving box for the hulls at the rear of the drum and opening into the passage, a receiving box for the meats in front of the drum, a shaking sieve box for separating the meats from the hulls of crushed seed and delivering the meats to the receiving box for the meats and the hulls to the passage at the front of the drum, and means for controlling the draft produced by the drum adjacent to the point of delivery of the shaker box.

2. In a machine of the character stated, the combination of a main frame, a revolving drum, a casing over the drum to form a draft passage, a receiving box for the hulls at the rear of the drum and opening into the passage, a receiving box for the meats in front of the drum, a shaking sieve box for separating the meats from the hulls of crushed seed and delivering the meats to the receiving box for the meats and the hulls to the passage at the front of the drum, and means for controlling the draft produced by the drum adjacent to the point of delivery of the shaker box comprising a baffle board adjustable toward or from the surface of the drum and above which the hulls are delivered.

3. In a machine of the character stated, the combination of a main frame, a revolving drum, a casing over the drum to form a draft passage, a receiving box for the hulls at the rear of the drum and opening into the passage, a receiving box for the meats in front of the drum, a shaking sieve box for separating the meats from the hulls of crushed seed and delivering the meats to the receiving box for the meats and the hulls to the passage at the front of the drum, and means for controlling the draft produced by the drum adjacent to the point of delivery of the shaker box comprising an adjustable baffle plate hinged to the rear side of the box for receiving the meats and controlling the air passage between said box and the surface of the drum.

4. In a machine of the character stated, the combination of a main frame, a revolving drum, a casing over the drum to form a draft passage, a receiving box for the hulls at the rear of the drum and opening into the passage, a receiving box for the meats in front of the drum, a shaking sieve box for separating the meats from the hulls of crushed seed and delivering the meats to the receiving box for the meats and the hulls to the passage at the front of the drum, and means for controlling the draft produced by the drum adjacent to the point of delivery of the shaker box comprising an adjustable baffle board forming a contracted passage between it and the drum at the discharge end of the sieve box to receive the hulls and guide them into the current of air formed by the drum, and a baffle plate hinged adjacent to the receiving box at a lower level than the baffle board and adjustable to control the amount of air permitted to pass with the surface of the drum.

5. In a machine of the character stated, the combination of a main frame, a revolving drum, a casing over the drum to form a draft passage, a receiving box for the hulls at the rear of the drum and opening into the passage, a receiving box for the meats in front of the drum, a shaking sieve box for separating the meats from the hulls of crushed seed and delivering the meats to the receiving box for the meats and the hulls to the passage at the front of the drum, means for controlling the draft produced by the drum adjacent to the point of delivery of the shaker box, and means to agitate the hulls after leaving the sieve box whereby the lighter particles may be sucked off by the draft produced by the drum and the heavier particles fall by gravity into the receiving box for the meats.

6. In a machine of the character stated, the combination of a main frame, a revolving drum, a casing over the drum to form a draft passage, a receiving box for the hulls at the rear of the drum and opening into the passage, a receiving box for the meats in front of the drum, a shaking sieve box for separating the meats from the hulls or crushed seed and delivering the meats to the receiving box for the meats and the hulls to the passage at the front of the drum, means for controlling the draft produced by the drum adjacent to the point of delivery of the shaker box, and means to agitate the hulls after leaving the sieve box whereby the lighter particles may be sucked off by the draft produced by the drum and the heavier particles fall by gravity into the receiving box for the meats, said agitating means comprising a trough having perforations, a revolving drum having projections rotatably journaled in the trough, and a baffle board extending downward to form a contracted air passage close to the revolving drum.

7. In a machine of the character stated, the combination of a main frame, a revolving drum, a casing over the drum to form a draft passage, a receiving box for the hulls at the rear of the drum and opening into the passage, a receiving box for the meats in front of the drum, a shaking sieve box for separating the meats from the hulls of crushed seed and delivering the meats to the receiving box for the meats and the hulls to the passage at the front of the drum, means for controlling the draft produced by the drum adjacent to the point of delivery of the shaker box, and means to agitate the hulls after leaving the sieve box whereby the lighter particles may be sucked off by the draft produced by the drum and the heavier particles fall by gravity into the receiving box for the meats, said agitating means comprising a trough having perforations, a revolving drum having projections rotatably journaled in the trough, a baffle board extending downward to form a contracted air passage close to the revolving drum said trough, drum and baffle board hinged to the casing, and adjusting means for adjusting the baffle board to or from the drum.

8. In a machine of the character stated, the combination of a main frame, a revolving drum, a casing over the drum to form a draft passage, a receiving box for the hulls at the rear of the drum and opening into the passage, a receiving box for the meats in front of the drum, a shaking sieve box for separating the meats from the hulls of crushed seed and delivering the meats to the receiving box for the meats and the hulls to the passage at the front of the drum, means for controlling the draft produced by the drum adjacent to the point of delivery of the shaker box, and means to agitate the hulls after leaving the sieve box whereby the lighter particles may be sucked off by the draft produced by the drum and the heavier particles fall by gravity into the receiving box for the meats, said agitating means comprising a trough having perforations, a revolving drum having projections rotatably journaled in the trough, a baffle board extending downward to form a contracted air passage close to the revolving drum said trough, drum and baffle board hinged to the casing, adjusting means for adjusting the baffle board to or from the drum, and means for adjusting the trough, drum and baffle board vertically.

9. In a machine of the character stated, the combination of a main frame, a revolving drum, a casing over the drum to form a draft passage, a receiving box for the hulls at the rear of the drum and opening into the passage, a receiving box for the meats in front of the drum, a shaking sieve box for separating the meats from the hulls of crushed seed and delivering the meats to the receiving box for the meats and the hulls to the passage at the front of the drum, means for controlling the draft produced by the drum adjacent to the point of delivery of the shaker box, and means to agitate the hulls after leaving the sieve box whereby the lighter particles may be sucked off by the draft produced by the drum and the heavier particles fall by gravity into the receiving box for the meats, said agitating means comprising a trough having perforations, a revolving drum having projections rotatably journaled in the trough, a baffle board extending downward to form a contracted air passage close to the revolving drum said trough, drum and baffle board hinged to the casing, adjusting means for adjusting the baffle board to or from the drum, and means for adjusting the trough, drum and baffle board vertically consisting of a plate fitting the casing over the drum, racks secured to the casing and having downward extensions to which the trough is pivoted, pinions meshing with the racks, and a manually controlled shaft to which the pinions are secured.

10. In a machine of the character stated, the combination of a main frame, a revolving drum, a casing over the drum to form a draft passage, a receiving box for the hulls at the rear of the drum and opening into the passage, a receiving box for the meats in front of the drum, a shaking sieve box for separating the meats from the hulls of crushed seed and delivering the meats to the receiving box for the meats and the hulls to the passage at the front of the drum, means for controlling the draft produced by the drum adjacent to the point of delivery of the shaker box, conveyers for the two receiving boxes, and power means for operating the drum, sieve box, and conveyers.

11. In a machine of the character stated, the combination of a revolving drum, a casing over the drum to provide a draft passage, means to receive the hulls at the back of the draft passage, means to receive the meats at the front of the draft passage, a shaking sieve box for separating the meats from the hulls, and means at the discharge end of the sieve box for separating the falling meats and hulls and guiding the latter next to the drum to be acted upon by the draft whereby the lighter particles pass over the drum and heavier particles fall by gravity in the means to receive the meats.

12. In a machine of the character stated, the combination of a revolving drum, a casing over the drum to provide a draft passage, means to receive the hulls at the back of the draft passage, means to receive the meats at the front of the draft passage, a shaking sieve box for separating the meats from the hulls, means at the discharge end of the sieve box for separating the falling meats and hulls and guiding the latter next to the drum to be acted upon by the draft whereby the lighter particles pass over the drum and heavier particles fall by gravity in the means to receive the meats, and means to adjust the strength of the air draft produced by the drum.

13. In a machine of the character stated, the combination of a revolving drum, a casing over the drum to provide a draft passage, means to receive the hulls at the back of the draft passage, means to receive the meats at the front of the draft passage, a shaking sieve box for separating the meats from the hulls, and a second sieve into which the hulls are delivered and agitated to still further separate the meats and for delivering the lighter hull portions to the drum to be acted upon by the draft produced thereby.

14. In a machine of the character stated, the combination of a revolving drum, a casing over the drum to provide a draft passage, means to receive the hulls at the back of the draft passage, means to receive the meats at the front of the draft passage, a shaking sieve box for separating the meats from the hulls, a second sieve into which the hulls are delivered and agitated to still further separate the meats and for delivering the lighter hull portions to the drum to be acted upon by the draft produced thereby, and means to adjust the strength of the air draft produced by the drum.

15. In a machine of the character stated, the combination of means for producing a draft of air, a meat box, a vibrating sieve box for separating the meats from the hulls and delivering the meats to the meat box, and means receiving the hulls and agitating them to separate further meats and projecting the lighter hulls into the air draft to be conveyed away from the meat box.

16. In a machine of the character stated, the combination of means for producing a draft of air, means to control the strength of the draft, means to adjust the strength of the draft, a meat box, a vibrating sieve box for separating the meats from the hulls and delivering the meats to the meat box, and means receiving the hulls and agitating them to separate further meats and projecting the lighter hulls into the air draft to be conveyed away from the meat box.

17. In a machine of the character stated, the combination of means for producing a draft of air, a meat box, a vibrating sieve box for separating the meats from the hulls and delivering the meats to the meat box, and means receiving the hulls and agitating them to separate further meats and projecting the lighter hulls into the air draft to be conveyed away from the meat box, said means comprising a perforated trough above the meat box and a revolving agitating device therein for projecting the unsieved particles into the air draft for further action.

In testimony of which invention, I hereunto set my hand.

ALFRED D. KENNEDY.

Witnesses:
W. LINDSAY WILSON,
PAUL J. MAHONEY, Jr.

Copies of this patent may be obtained for five cents each, by addressing the "Commissioner of Patents, Washington, D. C."